Nov. 17, 1931.  T. E. PERKS  1,831,879
GAS WATER HEATER SYSTEM
Filed April 29, 1930
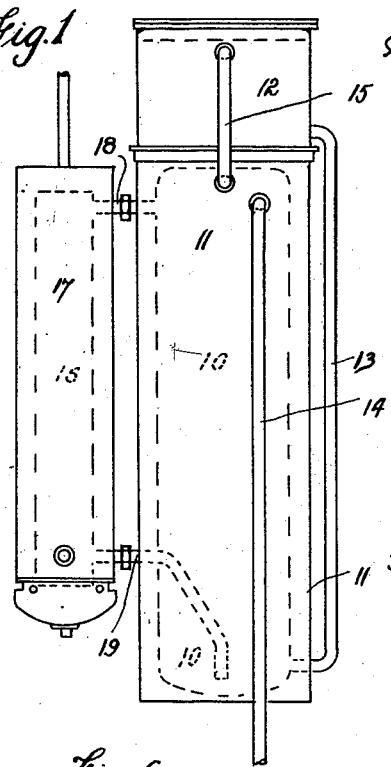
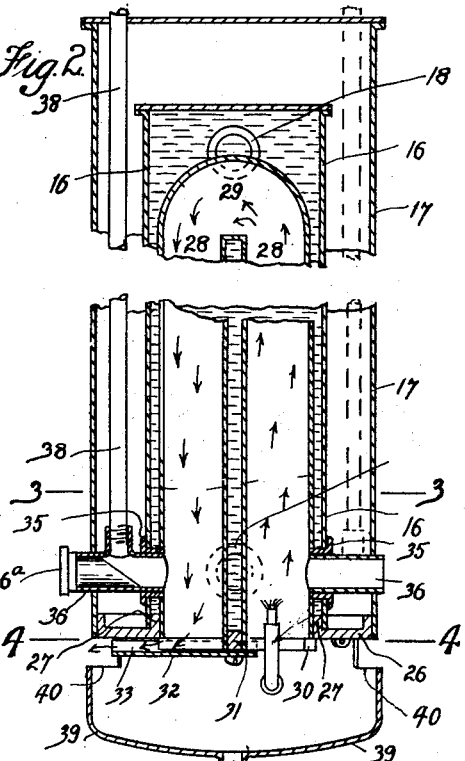
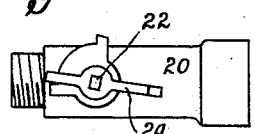
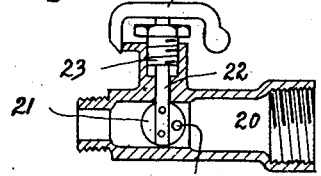
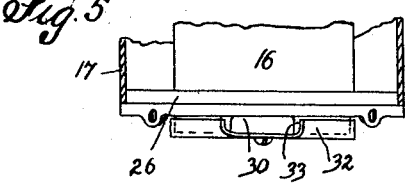
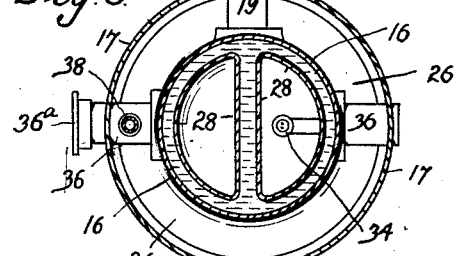
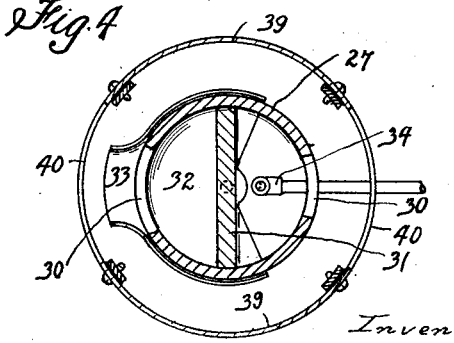
Inventor:
Thomas Edgar Perks Patented Nov. 17, 1931

1,831,879

UNITED STATES PATENT OFFICE

THOMAS EDGAR PERKS, OF REMUERA, NEW ZEALAND

GAS WATER HEATER SYSTEM

Application filed April 29, 1930, Serial No. 448,322, and in New Zealand May 25, 1929.

This invention relates to a gas heated water system, in which any approved form of inflammable gas may be used, and by means of which a body of water contained within a storage tank of any desired capacity may be heated by connection in a convection circulatory system with a heater unit, the heat to which is supplied by a gas burner, and which is of a special design such as to provide for a maximum heat transfer with a minimum expenditure of gas.

The invention embodies the combination of such a heater unit in a system in which the storage tank, and a supply cistern therefor, are employed, and in which provision is made for the thermostatic control of the heat employed, and also for the circulation through the system being controlled.

The invention consists generally in the combination with a storage chamber having means for maintaining a supply of water thereto, of a heater of special design connected to the storage chamber on a circulatory convection system, by which design provision is made for the circulation of the water through an annular space within the heater and in contact with the outline surfaces of flue passages contained within the heater and through which heated currents are caused to travel in a suitably controlled manner.

This construction is shown in the accompanying drawings, in which:—

Figure 1 is an elevation of the complete installation.

Figure 2 is a sectional elevation, on an enlarged scale, of the heater part of the installation.

Figure 3 is a sectional plan thereof on the line 3—3 of Figure 2.

Figure 4 is a sectional plan on the line 4—4 of Figure 2.

Figure 5 is an elevation detail of the lower end of the heater.

Figures 6 and 7 are plan and sectional elevation, on an enlarged scale, of a control valve adapted to be arranged within the circulatory system of the installation for a purpose to be hereinafter explained.

In giving effect to the invention, a vertical water holding cylinder or storage tank 10 is provided, such being of any approved holding capacity. It is also preferably contained within a surrounding casing 11 and the space between packed with a heat insulating medium so that escape of heat from the cylinder, by radiation, is minimized. Above the cylinder a water supply cistern 12 is mounted such cistern being kept charged with water from the supply service through a float controlled valve (not shown) in the well known way. This cistern connects with the lower end of the cylinder 10 through the pipe 13 in order to keep the cylinder full of water. A draw off pipe 14 leads away from near the upper end of the cylinder, the water drawn off being replaced by gravity flow from the cistern 12. There is also an overflow or pressure safety vent pipe 15 leading from near the upper end of the cylinder 10, into the cistern, above the normal water level therein.

Disposed vertically alongside the cylinder 10 is the cylindrical heater chamber 16, the sides and top of which also are surrounded by a heat insulation packed casing 17. Any other approved manner of insulating this chamber, and also the cylinder 10, may be adopted if so desired.

The heater chamber 16 is connected at its upper end with the upper end of the cylinder 10 by means of the pipe 18, and at its lower end with the lower end of the cylinder, by the pipe 19. This provides for the chamber being filled with water from the cylinder and for the circulation of water, up through the chamber, and down through the cylinder, on the well known convection system, when the chamber is subjected to heat action.

The connection 19 may if so desired, have a control valve placed within it to control the rate at which the circulation is carried on and thereby to provide for the rapid heating of the water within the chamber 16 and for the collection thereof within the upper end of the cylinder for withdrawal. This will allow for a small quantity of hot water being obtained without having to wait for the full quantity within the cylinder being heated. A valve suitable for such control is shown in Figures 6 and 7 and comprises a valve casing 20, and a disc 21 disposed therein and attached to a spindle 22 that passes out through a gland bearing 23 and has a handle 24 on its outer end for turning it. The disc is made of an area corresponding to the cross sectional area of the casing so that when turned to extend across such area it will shut it off completely, and when turned to extend lengthwise, it will open it to full flow. The disc is, however, made with a small aperture 25 through it so that when the valve is closed, provision is made for a slow transfer of water that will act as a safeguard against damage through any overheating of the water within the heater.

In instances where the more rapid collection of heated water within the upper end of the cylinder 10 is required as a permanent feature, either connection 18 or 19 may have embodied within it a disc plate extending across its area and made with a small hole therein so that the rate of circulation is controlled by the area of the hole. This may be of any desired extent, according to the requirements of the case.

The heater unit of the combination is constructed in detail as shown in Figures 2 to 5, the chamber 16 and its casing 17 being made fast respectively to the inner and outer edges of an annular frame plate 26, the inner peripheral edge of which is made with an upwardly and downwardly extending flange 27. Two tubular flues 28, each of approximately semi-circular shape in cross section are disposed side by side to extend upwardly through the main portion of the height of the chamber, these being affixed within the inside of the flange 27 and being of a size such that an annular narrow space is left between them and the inside of the chamber wall and also so that a narrow space, in communication with this annular space, is left between the flat adjacent sides of the two flues. The upper ends of the flues are then connected by a bend 29 to make a continuous flue passage leading upward, and then downward, throughout the height of the chamber and the lower ends of which are open through the frame plate 26. The lower part of the flange 27 is made with a vent opening 30 opposite the lower open end of each flue.

A cross bar 31 is fixed to extend diametrically across between the lower ends of the two flues and thereby to close the space above. A narrow space for water is thus contained between the outside of the flues and the inside of the chamber 16. The water as it flows from the cylinder 10, and back again, flows up through this space.

A cover plate 32 is provided for covering the half of the frame plate opening below the end of one of the flue pipes, such plate being made to fit up against the flange 27 and to overlap its outside and being also made with sides curving to an open mouth 33. It is secured in position by being screwed to the centre of the cross bar 31 and may therefore be turned on this screw as a pivot, to more or less uncover the opening of such flue pipe and the outlet through the vent 30 on that side and at the same time to also more or less partially cover the opening into the other flue pipe. It may also be turned right across to lie beneath the lower end of the other flue, thus making provision for either flue being the upflue or downflue and permitting of the heater's adaptation to the service provisions of the place in which it is installed.

A gas burner 34 of approved design is arranged to project upwardly into the flue pipe the end of which is uncovered and thus when this is lit, to provide for a heated updraught of gas and air to pass upwardly through the one flue and then down through the other, to escape to the outside above the plate 32. By the adjustment of the position of this plate, the amount of air admitted to the flame of the burner and the strength of the draught may be adjusted to provide for the most effective heating of the flue walls and the interchange of the heat to the water flowing up upon their outer surfaces. The control of the gas flame will be governed by a thermostatic appliance acted upon by the water in the cylinder, to turn on the gas supply or to shut it off, in a manner well known in the art.

While an ordinary coal gas burner is shown in the drawings, as the heating agency, it will readily be understood that other forms of burners and other kinds of gases may be used with equal effectiveness.

Inspection openings 35 are made in the wall of the chamber 16 and extending into the flue pipes, near the lower end of the heater. Such openings have tubes 36 inserted into them and extending out through the casing 17. These are sealed with suitable stoppers or caps one of which is shown at 36ª in Figure 2.

Alternative outlet provision for the flue passage may be made, as shown in Figure 2, by providing the tube 36 opening from the down flue, with a pipe branch 38 leading upwardly therefrom through the inside of the casing 17 and out through its top. In this case the damper plate 32 is made without its outlet 33 and so that it closes the vent 30 on that side. Also the strength of the draught may be regulated by constructing the stopper cap 36ª with a tubular extension into the tube 36, the inner end of which is tapered and overlaps the mouth of the branch 38, as shown in Figure 2, in order that by turning the cap round to different positions, the said mouth may be more or less covered, or entirely uncovered.

The employment of this vent pipe will also serve to prevent the accumulation of any gas fumes or unburnt gases in or about the lower end of the flue, while similar escape provision for the fumes or gases collecting in or about the upflue, may be made by fitting a similar vent pipe into the other tube 36, as indicated by dotted lines in Figure 2.

These vent pipes may be carried up to beneath a collecting hood leading to the outside in a well known manner to convey the gases and fumes to outside the building.

A drip collecting pan 39 is provided to fit over the outside of the frame plate 26 and to be secured thereto, such pan having openings 40 in its side to correspond with the vents 30 and having a central drain hole 41 to which a drain pipe may be connected.

I claim:—

1. A gas water heater, particularly for use in connection with a supply source by the circulation of the water therethrough, comprising a base plate of annular form having a vertical flange on its inner periphery; a vertical cylinder affixed to the outer periphery of said flange; a pair of semi-circular flues disposed side by side concentrically within the cylinder in spaced relation and attached to the inner periphery of the said flange, the upper ends of the flues being connected together to form a continuous passage; a gas burner positioned beneath the lower end of one flue; a damper plate positioned to move laterally beneath the lower end of the other flue and having an outlet; and circulation connections leading from the water supply source into the lower end of said cylinder and from the upper end of the cylinder back to the supply source.

2. In a gas water heater according to claim 1, in which a vent opening leads from each flue near its lower end radially outward through the said cylinder.

3. In a gas water heater according to claim 1, in which a cylinder enclosing casing is affixed to the outer peripheral edge of the said base plate and a drip pan also affixed to such edge to depend therefrom.

In testimony whereof, I affix my signature.

THOMAS EDGAR PERKS.